Oct. 10, 1961   W. J. ELY ET AL   3,003,446
APPARATUS FOR FORMING TUBES
Filed Sept. 25, 1957   4 Sheets-Sheet 4

FIG-5-

INVENTORS:
WALTER J. ELY,
ADOLPH A. HALE.
BY
Harry O. Ernoberger
ATTY.

APPARATUS FOR FORMING TUBES
Walter J. Ely, Grand Haven, and Adolph A. Hale, Spring Lake, Mich., assignors to Oldberg Manufacturing Company, Grand Haven, Mich., a corporation of Michigan
Filed Sept. 25, 1957, Ser. No. 686,182
9 Claims. (Cl. 113—34)

This invention relates to apparatus for forming tubing and more especially to the formation of seamed tubing from sheet metal strips or blanks.

Various forms of apparatus have been developed and utilized for forming tubes from metal strips by configurating the edge regions of the strips, forming the configurated strips to substantially circular cross-section, and interlocking the configurated edge regions of the strips to provide lock-seam tubes. Certain forms of apparatus employed for the purpose utilize a dual chain drive for reciprocating a carriage equipped with sets of rolls for bending and forming a metal sheet into a closed seamed tube. Heretofore the chains for reciprocating the carriage have been driven from sprockets mounted upon a single shaft. Forces of high magnitude are required for reciprocating the carriage and therefore multiple chains have been employed for the purpose.

Due to the tremendous actuating forces involved in moving the carriage to effect the bending and forming operations, considerable wear of the sprocket teeth and roller elements of the chains engaging the teeth ensues and hence the forces moving the carriage may be borne entirely by a single chain resulting in breakage thereof with consequent interruption of tube forming operations.

The present invention embraces an apparatus for establishing an equalization of carriage reciprocating forces between driving chains whereby the driving forces at all times are equally distributed between the chains.

An object of the invention is the provision of improved apparatus for forming tube constructions from metal sheets, the tube constructions being especially usable as components of sound attenuating muffler assemblies for use with exhaust gas streams wherein the finished tubes will be of uniform cross-sectional dimension throughout their length.

Another object of the invention resides in the provision of an improved apparatus embodying a reciprocable carriage equipped with metal configurating devices and forming rolls wherein the carriage is actuated by dual means through the medium of a novel differential mechanism or power dividing means for equalizing the distribution of forces between the dual driving means irrespective of the condition of wear of the said means.

Another object of the invention resides in an improved apparatus for forming tubes from sheet metal blanks wherein the components of the tube forming mechanism are actuated through positive drive components in which the operation of the machine is automatic and capable of continuous operation with a minimum liability of breakdowns of the apparatus and interruptions of the tube forming operations.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

While the form of apparatus of the invention illustrated in the drawings is particularly adaptable for carrying out steps in the method utilized in forming tubes of circular cross-section from sheets of metal, it is to be understood that the principles of the invention may be utilized with other forms of mechanism wherever the same may be found to be applicable. It is to be further understood that the apparatus of the invention is adaptable for forming tubes from both perforate and imperforate metal sheets or blanks or for forming tubes from blanks provided with flutes or ribs or other surface configurations.

In the utilization of the embodiment of the apparatus disclosed for carrying out the method of forming tubes of predetermined length from flat sheet metal strips or blanks, the blanks are delivered to a receiving station and are successively fed or delivered adjacent a mandrel at a tube forming station. At the tube forming station, a suitable die forms the blank into a substantially U-shaped configuration by bending the same approximately one half of the way around the mandrel with the opposed leg or wall portions of the U-shape extending in parallelism. With the U-shaped blank held in this position, a carriage, equipped with bending and forming rolls and devices, is moved lengthwise of the U-shaped blank during which movement the bending and forming means on the carriage engage the blank on the mandrel forming the same into a completed tube. Upon return movement of the carriage the finished tube is stripped from the mandrel.

Figure 1:
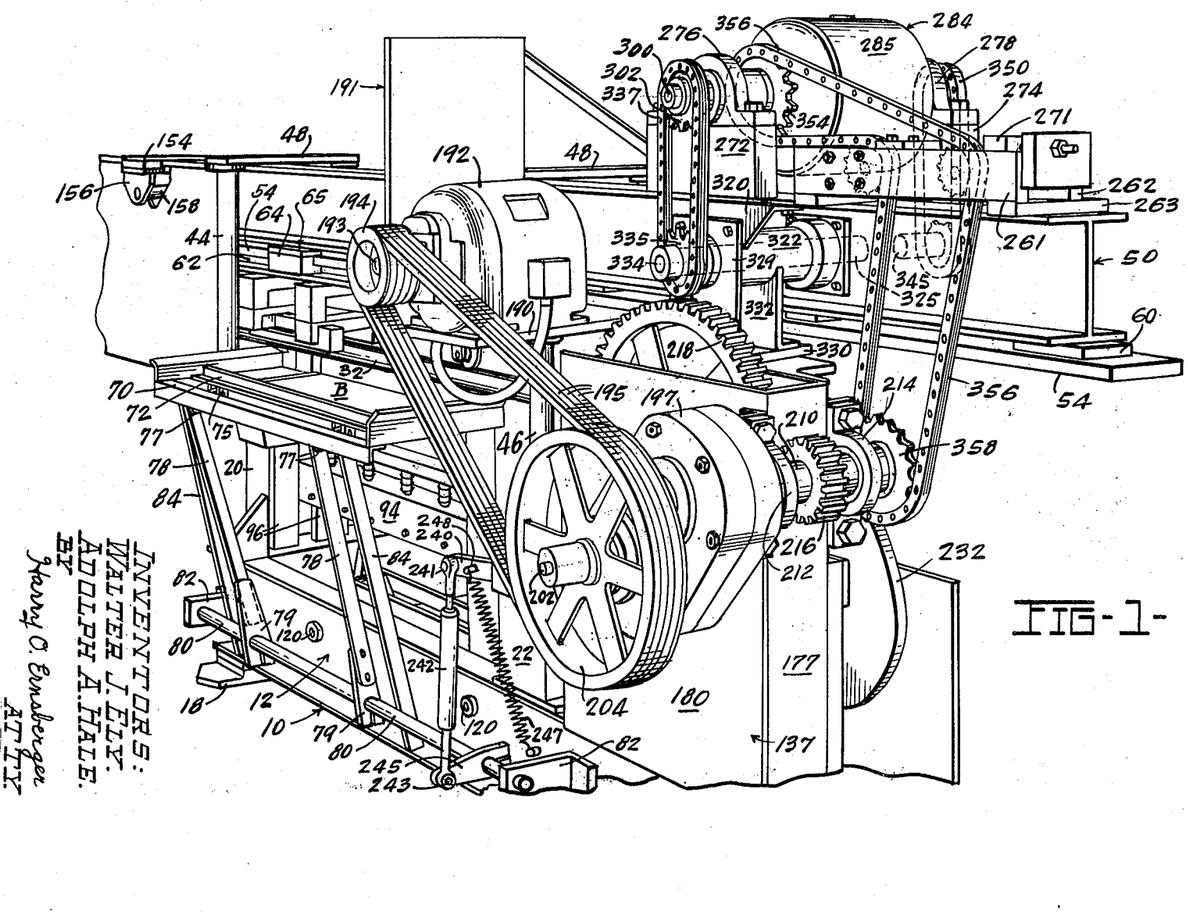
FIGURE 1 is a perspective view of one side of the apparatus of the invention particularly showing the driving arrangement for the various components of the apparatus.
Figure 2:
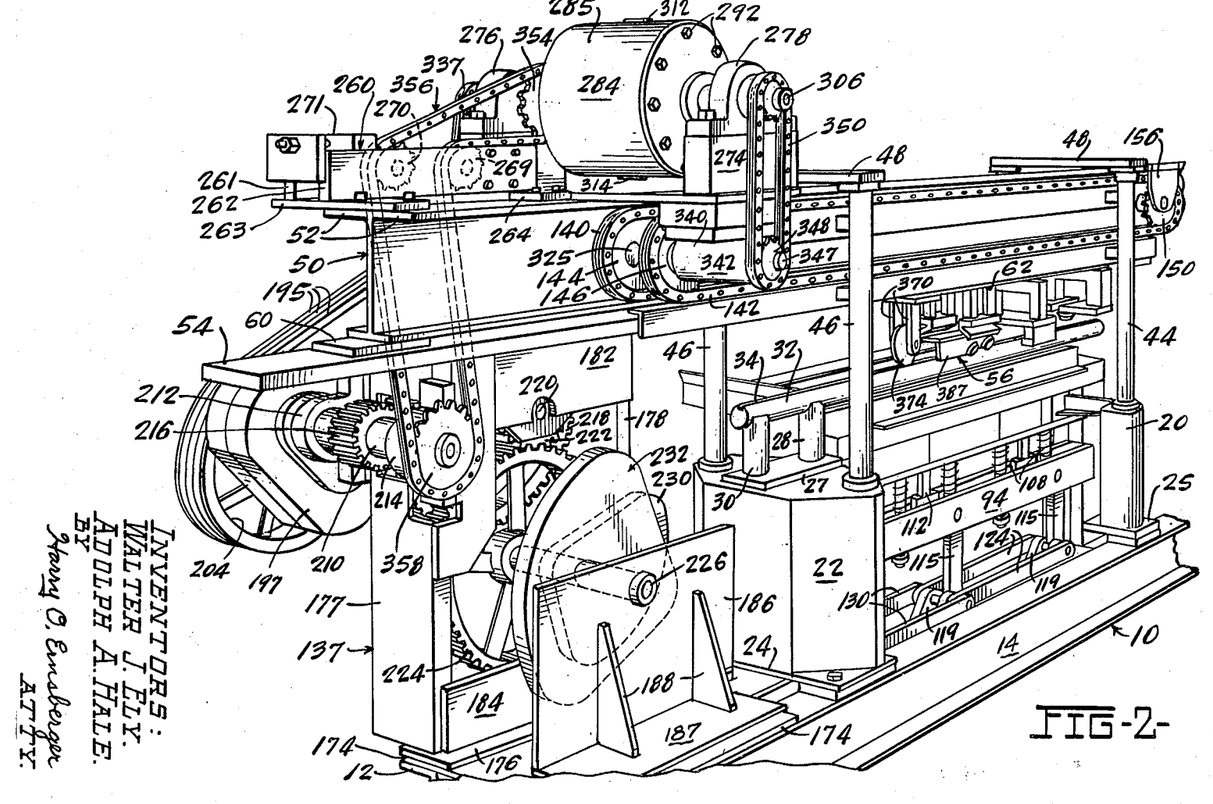
FIGURE 2 is a perspective view from the opposite side of the apparatus.
Figures 3, 4:
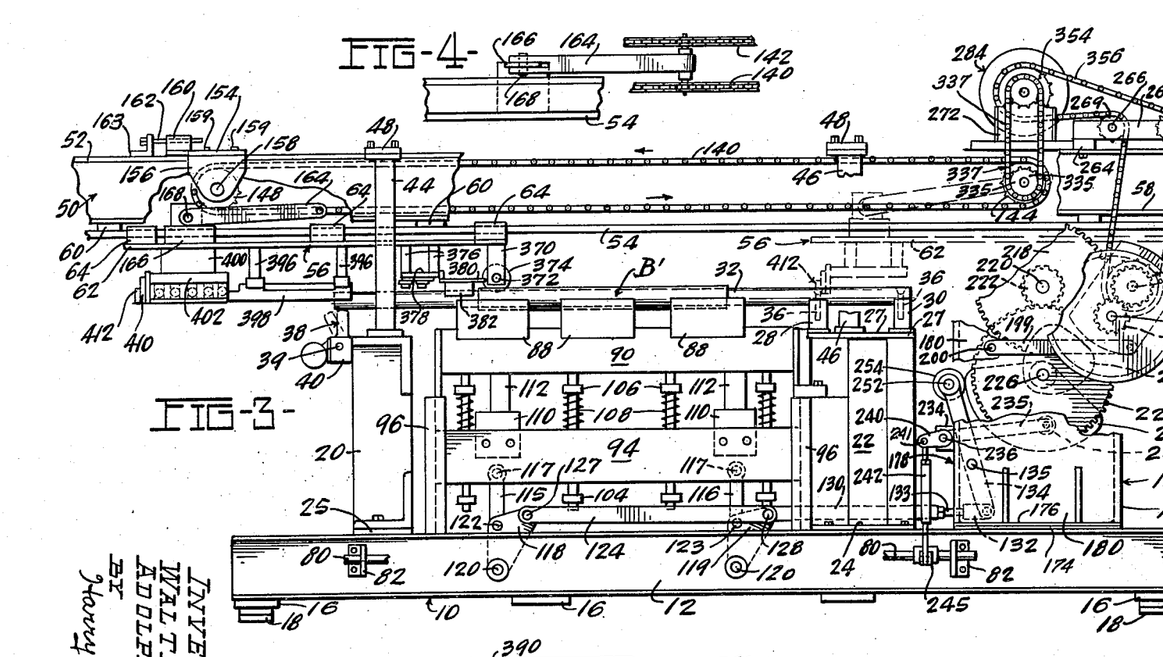
FIGURE 3 is a side elevational view of the machine, the view being taken at the side at which the sheet metal blanks are fed to the tube forming mechanism.
FIGURE 4 is a fragmentary top plan view illustrating the operative connection between dual driving chains and the carriage.

Referring to the drawings in detail and initially to FIGURES 1 through 3, the apparatus is inclusive of a frame 10 having two longitudinally extending channel shaped structural members 12 and 14 connected by transversely extending frame members 16, shown in FIGURE 3 which are welded or otherwise secured to the channel members 12 and 14. The members 16 adjacent the ends of the channel members 12 and 14 are provided with supporting feet 18 adapted to rest upon the floor or other support.

Spaced lengthwise of the longitudinally extending frame members 12 and supported thereby are pedestals or upwardly extending members 20 and 22. The pedestal 22 is provided with a baseplate 24 which extends transversely of the frame members 12 and 14 and is supported thereby. The pedestal 20 is mounted upon a transversely extending plate 25 supported by the frame members 12 and 14. The pedestals 20 and 22 are preferably formed of a plurality of vertically disposed metal plates welded together to form hollow configurations.

A transversely extending plate 27 is supported upon the pedestal 22. Secured to the plate 27 and extending upwardly therefrom are members 28 and 30 which support the end region of a mandrel 32, the latter being of circular cylindrical configuration in cross-section in the embodiment illustrated and is provided at its upper region with a longitudinally extending recess or slot 34 as shown in FIGURE 2. The mandrel 32 is securely fastened to the upwardly extending members 28 and 30 by means of securing screws 36 which are countersunk beneath the longitudinally extending slot 34 to facilitate longitudinal reciprocation of the carriage 56 equipped with the forming and bending devices for producing a tube.

The opposite end region of the mandrel 32 is adapted to be supported by an upwardly extending member 38 pivotally supported upon a shaft 39 extending through suitable openings in spaced projections 40 secured to the pedestal 20. The movably supported member 38 is adapted to be swung away from engagement with the end of the mandrel in order to facilitate stripping a finished tube from the mandrel.

Mounted upon each of the pedestals 20 and 22 is a pair of upwardly extending posts or struts 44 and 46, the posts of each pair being connected together by a transversely extending member 48. Extending longitudinally of the apparatus is an I-shaped beam 50, the upper flange portions 52 of which are bolted or welded to the plates 48 whereby the I-beam is suspended from the plates 48. Disposed beneath and arranged in substantial parallelism with the beam 50 is a plate 54 forming a track or way adapted to support the carriage 56 which is equipped with the metal bending and forming devices.

The plate or track 54 is spaced from the lower flanges 58 of the beam 50 by means of transversely extending, longitudinally spaced strips or spacers 60, the spacers being welded or otherwise secured to the beam 50 and the track 54.

The carriage 56 is inclusive of a plate 62 extending substantially parallel with the track or way 54. Secured to the plate 62 and extending upwardly therefrom are spaced blocks or members 64.

Each of the blocks is formed to slidably accommodate the track 54, the blocks being formed with transversely extending flanges 65, one of which is shown in FIGURE 1 overtaking the upper surface of the plate 54 whereby the carriage 56 is suspended for movement longitudinally of the track 54. The carriage 56 is equipped with bending and forming devices which will be hereinafter explained which are utilized for bending and forming portions of a sheet metal blank into a tubular configuration. The carriage is reciprocated by means hereinafter described.

The apparatus of the invention is equipped with a blank receiving station equipped with feeding means adapted to successively deliver blanks into a position to be bent around the mandrel. As particularly shown in FIGURES 1 and 5, the blank receiving station includes a table or blank supporting member 70 upon which is slidably supported a bar 72 extending longitudinally of the table 70. The bar 72 is arranged to be slidably moved toward and away from the mandrel to deliver a blank adjacent the mandrel.

Secured to the bar 72 and spaced longitudinally thereof are members 74 which have downwardly extending projections 75 extending through transversely arranged slots formed in the table 70, and are connected by pivot pins 76 with links 77. The links are pivotally connected to the upper ends of members 78. Secured to the lower ends of each of the members 78 is a fitting or block 79 which is clamped upon or secured to a shaft 80 extending substantially parallel with the frame member 12 as shown in FIGURE 1.

Figure 5:
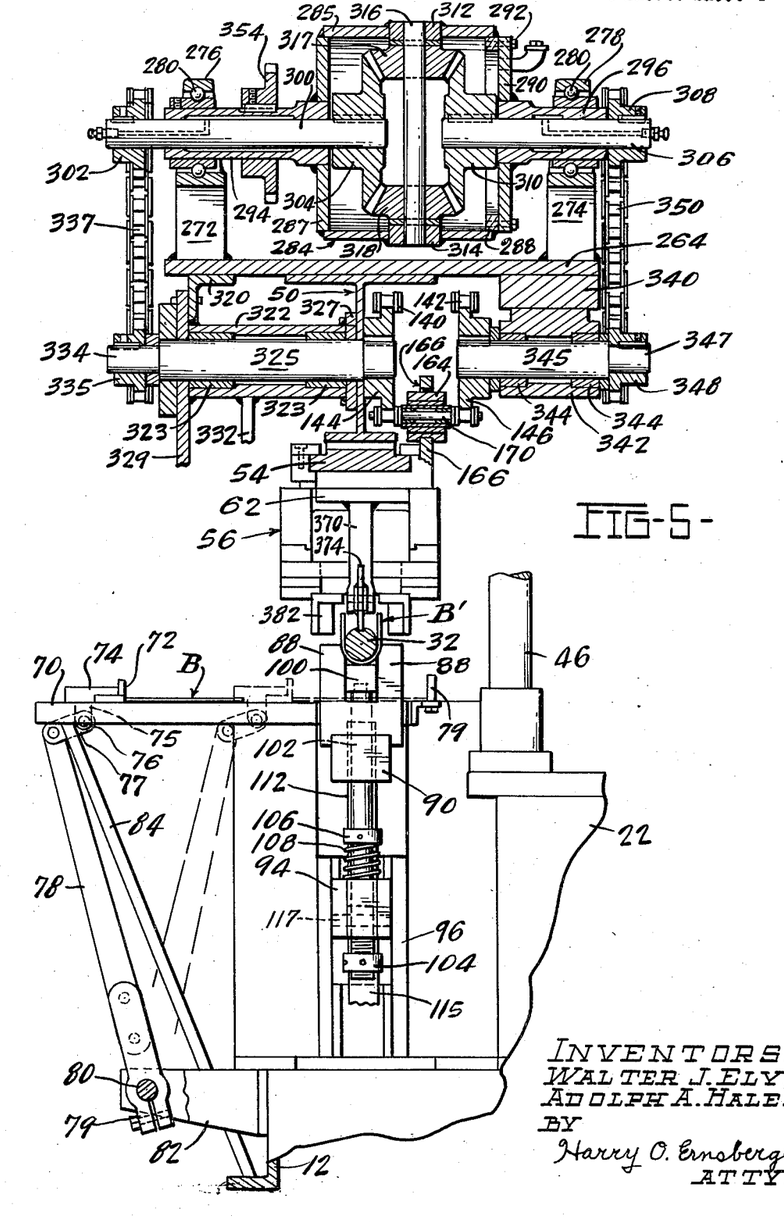
FIGURE 5 is a vertical sectional view through the driving arrangement for equalizing the forces transmitted to the carriage driving chains.

The shaft 80 is journaled in projections 82 which are welded to and extend laterally from the frame member 12. Rotation of the shaft 80 in one direction causes transverse movement of the bar 72 toward the mandrel and a blank positioned on the table 70 and against the bar 72 will be moved into a position adjacent the mandrel. The means for oscillating or rotating the shaft 80 will be hereinafter described. The table 70 is supported upon stationary struts 84, the lower ends of the struts engaging the lower flange of the frame member 12 as shown in FIGURES 1 and 5.

The arrangement is inclusive of a die and actuating means therefor for configurating the flat blank B around a portion of the circumference of the mandrel 32 to form a U-shape configuration. Disposed beneath the mandrel 32 and in spaced longitudinal relation is a plurality of die members 88, each formed with a recess of semicircular cross-section which is adapted to fold the blank B about the mandrel to the configuration shown in FIGURE 5. The dies 88 are secured to a block 90 which in turn is connected by members 112 with a second block 94 arranged parallel with but spaced vertically from the block 90.

The blocks 90 and 94 are vertically reciprocable, the end regions of which are in cooperative relation with vertically arranged ways 96 for maintaining the bars or blocks 90 and 94 in proper endwise relation. Slidably mounted in centrally disposed recesses formed in the dies 88 is a pad member 100, the upper surface of which is adapted for engagement with a flat blank to hold the central region thereof tightly in engagement with the mandrel 32 prior to contact of the dies 88 with the blank.

Secured to the bar 100 and depending therefrom is a plurality of spaced rods or shafts 102 which extend through openings in the bar 94 and have their lower ends threaded to accommodate abutments or stops 104. Supported on each of the rods 102 is a collar or flange 106 and disposed beneath each of the collars 106 is an expansive coil spring 108, the lower ends of the springs engaging means carried by the block 94 while the upper ends of the springs engage the collars 106 to resiliently urge or bias the bar 100 toward its uppermost position.

When the dies 88 are out of engagement with a blank, the upper surface of the blank holding bar 100 is slightly above the uppermost surface of the dies 88 so that the blank may be initially clamped between the mandrel 32 and the retainer pad or bar 100. Secured to the parallel members 94 are blocks 110 which are connected with the dies 88 by means of struts or other connecting means 112.

Mechanical means is provided for vertically reciprocating the dies 88 and bars 90 and 94. As particularly shown in FIGURE 3, toggle linkage is provided for the purpose. The arrangement includes links 115 and 116 which are pivotally connected to the bar 94 by means of stub shafts 117. A second set of links 118 and 119 is provided, the links 118 and 119 being pivotally connected with the frame construction 12 by means of stub shafts 120. The link 118 is connected with link 115 by means of a stub shaft 122 and the link 119 is connected with the link 116 by means of a stub shaft 123.

The links 118 and 119 are of generally triangular shape and are joined together by means of a connecting link or bar 124 pivotally joined to the link 118 by means of a stub shaft 127 and with the link 119 by means of a stub shaft 128. The link 119 is connected with an actuating rod or bar 130 which is associated with a clevis 132 connected with the bar 130 by means of a threaded member 133.

The clevis 132 is pivotally connected to one end of an oscillating beam or arm 134 which is pivoted or fulcrumed upon a shaft 135 journaled in suitable bearings carried by the side walls of a housing construction 137, the latter being supported upon the frame members 12 and 14. The arm 134 is adapted to be oscillated by cam means to be hereinafter described. By adjusting the threaded member 133, the extent of movement of the links 115, 116, 118 and 119 may be varied to regulate the vertical stroke of the dies 88.

The carriage 56 is driven by means of two chains 140 and 142, the chains being arranged in adjacent relation at one side of the I-beam 50. At the forward end of the machine, the chain 140 takes over a sprocket 144 and the chain 142 takes over a sprocket 146 as shown in FIGURE 5. The means for driving the sprockets 144 and 146 will be hereinafter described. At the rearmost region of the I-beam 50, the chain 140 takes over a sprocket 148, and the chain 142 takes over a sprocket 150, the latter being shown in FIGURE 2.

Extending transversely across the upper flanges 52 of the I-beam 50 is a plate 154 from which depends pairs of members 156, one of the members being shown in FIGURES 1 and 3. The members 156 provide journal bearings for a pair of stub shafts 158, one of which is shown in FIGURES 1 and 3. Each stub shaft journally supports one of the sprockets 148 and 150. The plate 154 and bearing supporting means 156 carried thereby are adjustably mounted upon the I-beam 50. The plate 154 is provided with slots extending longitudinally of the beam 50 and are adapted to accommodate bolts 159 extending through openings formed in the flanges 52 of the beam 50.

The plate 154 is formed with a boss portion 160, the boss being provided with a threaded bore to receive an adjusting bolt 162. An L-shaped member 163 is welded to the flange 52 of the I-beam 50, the upwardly extending leg of the member 163 having an opening to receive the adjusting bolt 162. Tension on the chains 140 and 142 may be adjusted or controlled by manipulation of the adjusting bolt 162, moving the plate 154 and the sprockets carried thereby lengthwise of the beam 50. After the proper tension is established, the bolts 159 may be drawn up to hold the sprockets in fixed relation.

The chains 140 and 142 are preferably of the roller and link type for minimizing friction between the sprocket teeth and the chain. The carriage 56 is operatively connected with the chains 140 and 142 through the medium of a connecting arm or link 164 shown in FIGURES 3 and 4. Secured to the plate 62 of the carriage 56 and extending upwardly therefrom is a projection 166. The projection 166 is pivotally connected with the arm 164 by a shaft 168 extending through openings in the arm 164. The end of the arm 164 is bifurcated as illustrated in FIGURE 4 to accommodate the upwardly extending projection 166.

The connection between the arm 164 and the chains 140 and 142 is illustrated in FIGURES 4 and 5. As particularly shown in FIGURE 5 a transversely extending shaft 170 has tenon portions accommodating conventional rollers or sleeves which engage the teeth on the sprockets. The arm 164 is equipped with bearings accommodating the shaft 170. The tenon portions on the shaft 170 extend through openings in sets of links of the chains 140 and 142 whereby the shaft 170 and link or arm 164 are moved concomitantly with the chains to cause reciprocating movement of the carriage 56.

From examination of FIGURE 3 it will be noted that the carriage 56 is moved in a right-hand direction on each working stroke, viz a tube forming stroke with the lower flight of the chains 140 and 142 moving in a right-hand direction. Through this arrangement force is transmitted through the arm 164 to the carriage 56.

When the carriage 56 reaches the completion of its working stroke in a right-hand direction as viewed in FIGURE 3, the end of the arm 164 is moved upwardly as illustrated in broken lines in FIGURE 3 and on the return stroke of the chains 140 and 142, the connection between the arm 164 and the chains is at the upper flight of the chains. Thus the chains 140 and 142 are continuously driven in one direction but through the connection of arm 164 with the carriage 56, the carriage is moved through a complete cycle of reciprocation with each complete cycle of traverse of the chains around the sprockets 144, 146, 148 and 150.

The means for driving the several components of the apparatus or mechanism of the invention is disposed at the forward region of the machine as shown in FIGURES 1, 2 and 3. Mounted upon the forward ends of the channel shaped members 12 and 14 is a transversely extending plate 174 welded or otherwise secured to the channel shaped members. Supported upon the plate 174 is a housing construction 137 comprising a baseplate 176, upwardly extending end plates 177 and 178, a side plate 180 at one side of the housing and plates 182 and 184 joining the end plates at the opposite side of the housing as shown in FIGURE 2.

Also supported upon the plate 174, as shown in FIGURE 2, is an upwardly extending member 186 integrally joined with a baseplate 187, the plate 186 being reinforced by triangularly shaped ribs 188. Mounted upon a plate 190 supported by the housing 137 is an electrically energizable motor 192, the controls for the motor being mounted upon a control panel 191. The motor shaft 193 is equipped with a driving pulley 194 which accommodates a plurality of driving belts 195 shown in FIGURE 1.

Supported adjacent the housing 137 is a supplemental housing 197 the housing 197 being anchored to the housing 137 by a bracing bar 199 connecting the housing 197 with an anchor pin 200 which is secured to the housing plate 180. Journally supported by the housing 197 is a shaft 202 upon which is mounted a pulley 204 which is driven by means of the belts 195.

Secured upon the shaft 202 and disposed within the housing 197 is a pinion 206, shown in FIGURE 3 which is in mesh with a gear 208 also contained in the housing 197 and which is mounted upon a shaft 210. It should be noted that the driving pulley 194 on the motor shaft 193 is of lesser diameter than the pulley 204 whereby the latter is driven at a reduced speed as compared with the speed of the motor shaft 193. As shown in FIGURE 3 the pinion 206 is of lesser diameter than the gear 208 driven thereby thus effecting further reduction in the speed of the shaft 210.

As shown in FIGURES 1 and 2, the shaft 210 extends exteriorly from the supplemental housing 197 and is journaled in suitable bearing members 212 and 214 which are secured to brackets carried by the side plates of the housing 137. Fixedly secured on the shaft 210 and disposed between the bearing members 212 and 214 is a pinion 216 which is in mesh with the teeth of a comparatively large driven gear 218 contained within the housing 137. The end wall 177 of the housing is provided with an opening to accommodate the enmeshment of the teeth of pinion 216 with the gear 218.

The gear 218 is mounted upon a shaft 220 which is journaled in bearings carried respectively by the housing plate 180 and the plate 182, the latter being illustrated in FIGURE 2. Also mounted upon the shaft 220 so as to rotate therewith is a pinion 222 which meshes with a comparatively large gear 224 also contained within the housing 137. The gear 224 is fixedly secured upon a shaft 226 which is journaled in suitable bearings mounted respectively in the housing side plates 180 and 186, the latter being shown in FIGURE 2.

Through the relative sizes of the pinion 216, gear 218, pinion 222 and gear 224, the shaft 226 rotates at a greatly reduced speed as compared with the speed of the motor shaft 193 so that considerable power or force is available at the shaft 226 for operating components of the apparatus.

With particular reference to FIGURE 3, it will be noted that there is mounted on the shaft 226, a cam 230 and a second cam 232, the latter being shown in FIGURES 1 and 2. The cam 230 is adapted to effect partial rotation of the shaft 80 to actuate the blank feeding mechanism illustrated in FIGURES 1 and 5 in order to feed a blank disposed upon the table 70 into a position beneath and adjacent the mandrel 32. As shown in FIGURE 3, there is secured to the end plate 178 of the housing 137 a block or fitting 234 equipped with a shaft 236 which forms a pivotal support for a lever or arm 235.

The distal end of the arm or lever 235 is equipped with a roller or follower 238 which is arranged in the path of movement traversed by the cam 230. Mounted upon the shaft 236 is an arm 240, the distal end of which is provided with a pivot shaft 241 to which is connected one end of a link or strut 242.

The opposite end of the link 242 is pivotally connected by a pivot pin 243 with an end region of an arm 245 fixedly secured upon the shaft 80. Anchored to the opposite end of the arm 245 is one end of a contractile spring 247, the opposite end of the spring being anchored as at 248 to the arm 240 as shown in FIGURE 1.

Thus during operation of the machine at each revolution of the shaft 220, the cam 230 engages the roller 238 to oscillate the arm 235, shaft 236 and the second arm 240 to effect an upward movement of the link 242, which action rotates the shaft 80 in a clockwise direction as viewed in FIGURE 5, actuating the arms 77 to move the blank feeding means 72 in a right-hand direction moving a blank B into a position adjacent the mandrel and against an adjustable stop member 79 shown in FIGURE 5 for properly positioning the blank.

The cam 232 is adapted to actuate the dies 88 shown in FIGURES 3 and 5 for bending and forming the flat blank partially around the mandrel 32. With particular reference to FIGURE 3, it will be noted that the upper end of the arm 134 is equipped with a stub shaft 252 upon which is journaled a roller or cam follower 254 which is disposed in the path of traverse of the cam 232.

At each revolution of the shaft 220, the cam 232 engages the roller 254 to swing the arm 134 in a counter-clockwise direction, as viewed in FIGURE 3, actuating the linkage mechanism 115, 116, 118 and 119 to elevate the dies 88 to the position shown in FIGURES 3 and 5 in which position the blank B has been folded approximately one half of the way around the mandrel 32 into a U-shaped configuration indicated at B′.

Means is provided whereby the motor 192 drives the carriage reciprocating chains 140 and 142. Mounted upon the forward end region of the I-beam 50 is a supplemental frame 260 comprising spaced side plates 261 and 262 carried by transversely extending plate portions 263 and 264. Extending transversely of the side plates 261 and 262 are shafts 266 and 267 which are journaled in suitable bearings carried by the side plates. Mounted upon the shaft 266 is a sprocket 269 and mounted upon the shaft 267 is a sprocket 270.

The arrangement for driving the carriage reciprocating chains 140 and 142 includes a power dividing device or differential means whereby substantially equal forces are transmitted respectively to the two chains. Welded or otherwise secured to the plate 264 are upwardly extending blocks or projections 272 and 274. The block 272 supports a housing 276 and the block 274 supports a housing 278 which enclose anti-friction or ball bearings 280.

Disposed between the bearing housings or cages 276 and 278 is a substantially cylindrical housing 284 which includes a cylindrical drum-like member 285 which is closed at one end by a circular plate 287 welded to the member 285 as shown in FIGURE 5. Welded to the opposite end of the member 285 is a ring or annulus 288 to which is secured an end plate 290, the plate 290 being secured to the annulus 288 by means of bolts 292 whereby the plate 290 may be removed for access to the interior of the housing 284 and to facilitate assembly of the mechanism.

Welded to the end plate 287 of the housing 284 is a substantially cylindrical member or sleeve 294 which is journaled in the bearings 280 contained within the bearing housing 276. Welded or otherwise secured to the removable end plate 290 of the housing construction is a cylindrical member or sleeve 296 which is journally supported in the bearings 280 carried by the bearing housing 278. Mounted within the sleeve 294 for relative rotation is a shaft 300, having a portion extending beyond the outer end of the sleeve 294. Mounted upon the end region of shaft 300 is a toothed sprocket 302 which is fixedly secured to the shaft.

The opposite end region of the shaft 300 extends into the interior of the housing 284 and keyed or otherwise secured on this end of the shaft is a bevel gear 304. Rotatably mounted within the sleeve 296 is a similar shaft 306, the outer end of which is equipped with a tooth sprocket 308 fixedly secured on the shaft to rotate therewith. The shaft 306 extends into the interior of the housing 284 and mounted upon this portion of the shaft is a bevel gear 310 of construction identical with the gear 304.

Diametrically opposed portions of the cylindrical housing member 285 are formed with boss portions 312 and 314 which are bored to accommodate a shaft 316. Journaled upon the shaft 316 are bevel pinions 317 and 318 of identical construction which mesh with the gears 304 and 310 respectively as illustrated in FIGURE 5.

Welded or otherwise secured to the plate 264 and depending therefrom is an L-shaped bracket 320. Positioned beneath the plate 264 is a hollow member or sleeve 322 equipped with bearings 323 in which is journaled a shaft 325. Welded to one end of the sleeve 322 is a plate 327 which is bolted or otherwise secured to the web portion of the I-beam 50, the shaft 325 having a tenon portion extending through an opening in the web of the I-beam. Welded to the opposite end of the sleeve 322 is a supporting plate 329 which is welded or otherwise secured to a baseplate 330 shown in FIGURE 1 which is supported by the housing 137.

A reinforcing plate 332 is secured to the sleeve 322 and the baseplate 330 in order to provide additional rigidity for the shaft supporting sleeve 322. The sprocket 144 is keyed or otherwise secured to the tenon portion of the shaft 325 and is engaged by the carriage driving chain 140. The opposite end of the shaft 325 is provided with a tenon portion 334 on which is mounted a sprocket 335 which is keyed to the tenon 334. A driving chain 337 engages the sprockets 302 and 335 to establish a drive connection between the shaft 300 and the shaft 325 as shown in FIGURE 5.

Disposed at the opposite side of the I-beam 50 and secured to and depending from the plate 264 is a member 340 to which is fastened a generally cylindrical housing 342 containing bearings 344 journally supporting a shaft 345. Keyed on one end region of the shaft 345 is the sprocket 146 which drives the chain 142 connected with the carriage 56. The shaft 345 is provided with a tenon 347 carrying a sprocket 348 keyed thereto for driving the shaft. A driving chain 350 connects the sprockets 308 and 348 whereby shaft 345 is driven from the shaft 306.

Keyed upon the sleeve 294 is a sprocket 354 which is engaged by a main driving chain 356. Mounted upon the shaft 210 adjacent the bearing supporting means 214 is a sprocket 358, shown in FIGURES 1 and 2, which is engaged by the driving chain 356. The driving chain 356 passes around the sprocket 358 thence around an idler sprocket 269, sprocket 354 and the idler sprocket 270 to establish a drive between the shaft 210 and the sleeve 294 secured to the housing 285.

Thus through this arrangement the housing 285 is driven from the shaft 210 and as the pinions 317 and 318 are in constant mesh with the gears 304 and 310, power will be transmitted equally to each of the shafts 300 and 306. Power or force is transmitted through shaft 300 and the chain 337 to the shaft 325 and sprocket 144 to drive the chain 140. Power or force is likewise transmitted through shaft 306, chain 350 to the shaft 345 and the sprocket 146 to drive the chain 142. Under operating conditions, the driving force imparted to each of the chains 140 and 142 is equal.

In the event that one or more chain rollers become worn or one or more teeth of the sprockets become slightly worn, there may be a tendency for the load on one of the chains to increase. Should this occur, the unequal forces thus transmitted to the shafts 300 and 306 cause relative rotation of the gears 304 and 310 and pinions 317 and 318 instantly equalizing the forces acting on the chains 140 and 142.

Hence in the apparatus of the invention, the load imparted to the chains 140 and 142 under the stresses of tube forming operations is equally divided between the chains irrespective of deficiencies in the chain construction or wear of the chain rollers or sprocket teeth. The equalization of driving forces between the two carriage actuating chains eliminates breakage of the chains as one chain never bears appreciably greater operating tension or force than the other. The idler sprockets 269 and 270 are journally supported upon an adjustable member 271 for regulating or controlling the tension in the driving chain 356 as shown in FIGURE 1.

The carriage 56 is equipped with bending and forming rolls of conventional construction for progressively forming a U-shaped blank B' on the mandrel 32 into a completed tube during movement of the carriage in a right-hand direction as viewed in FIGURE 3. Certain of the metal bending and forming rolls and devices and the operations performed thereby upon a metal blank are illustrated in FIGURES 6 through 10.

Secured to the forward end of the longitudinally extending carriage plate 62 is a bifurcated member 370, the furcations of the member 370 supporting a shaft 372 upon which a circular disc or roller 374 is rotatably mounted. The periphery of the roller 374 is of a width to extend into the longitudinal recess 34 formed at the upper region of the mandrel 32 and, as the carriage moves along the track 54, the roller 374 serves to prevent upward flexure of the mandrel 32 by reason of the upwardly acting force of the dies 88 in forming the blank into a U-shaped configuration about the mandrel.

The tube forming operations are performed by the tools carried or mounted upon the carriage 56 when the carriage moves in a right-hand direction as viewed in FIGURE 3. Depending from the carriage plate 62 and rearwardly of the bifurcated member 370 are depending members 376 to which is secured a plate 378. Secured to the plate 378 and the bifurcated member 370 is a member 380 carrying a pair of guide blocks 382 which engage and maintain the upwardly extending leg portions of the U-shaped blank B' in proper position to be engaged by bending and forming rolls.

Figures 6, 7, 8:
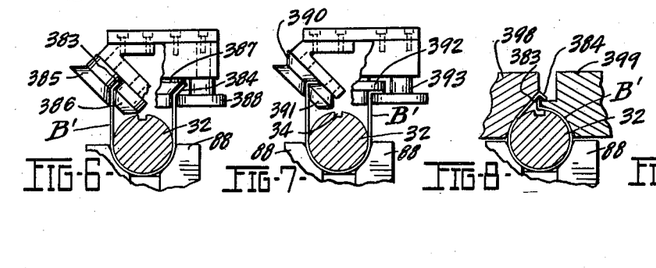
FIGURE 6 is an end view of rollers carried by the carriage for initially configurating edge regions of a sheet metal blank.
FIGURE 7 is an end view of the roller mechanism for further configurating the edge regions of the blank.
FIGURE 8 is a sectional view illustrating means for moving the configurated edge regions of a blank into overlapping relation.

Secured to the plate 378 are pairs of rolls which form angularly extending portions 383 and 384 on the leg portions of the blank B' as shown in FIGURE 6. The rolls 385 and 386 configurate the edge region of one of the legs of the blank to form the angular portion 383 while the rolls 387 and 388 engage the upper end region of the opposite leg of the blank to form the angular portion 384.

Also supported upon the plate 378 are additional forming rolls. As shown in FIGURE 7, forming rolls 390 and 391 are arranged to engage the angular portion 383 shown in FIGURE 6 and further bend the same to a position substantially at right angles to the adjacent leg of the blank B', while the forming rolls 392 and 393 configurate the angular portion 384 to a position substantially at right angles to the leg of the blank B'.

Disposed rearwardly of the members 376 and depending from the plate 62 of the carriage are members 396 to the lower ends of which are supported contouring dies or members 398 and 399 shown in FIGURE 8. The members 398 and 399 are shaped to interlock the portions 383 and 384 of the blank B' in the manner shown in FIGURE 8.

Figures 9, 10:
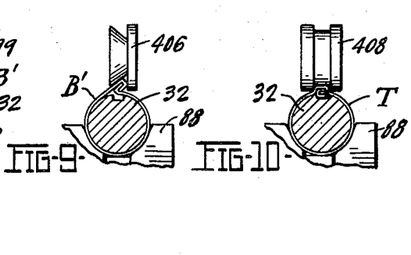
FIGURE 9 is a view illustrating the partial closing of the overlapped regions of a blank.
FIGURE 10 is a semi-diagrammatic view illustrating the final seam closing operation.

Arranged rearwardly of the members 396 and depending from the carriage plate 62 are members 400 which support a plate 402 equipped with a plurality of forming rolls for completing the formation of the seam by interlocking the portions 383 and 384 of the blank. FIGURE 9 is illustrative of a roll 406 for performing a partial closing operation in the formation of the seam. FIGURE 10 illustrates the final step in forming the seam by completely interlocking and flattening the overlapping portions of the blank B' to form a finished tube T. As shown in FIGURE 10 a form roll 408 is recessed to flatten the overlapping portions of the blank.

Arranged rearwardly of the plate 402 is a member 410 on which is pivotally mounted a stripper finger 412. The extreme position of movement of the carriage 56 at the completion of a tube forming operation is illustrated in broken lines in FIGURE 3. Upon return movement or reciprocation of the carriage in a left-hand direction as viewed in FIGURE 3, the stripper finger 412 engages the end of the finished tube T on the mandrel and strips or discharges the tube therefrom.

The sequence of operations in the formation of a tube from a sheet metal blank whether perforated or imperforate is as follows: The motor 192 is energized to initiate the operation of the various moving components of the apparatus. A flat metal blank B is delivered on to the table 70 either by manual means or by automatic means, the blank being disposed with a lengthwise edge thereof in engagement with the feed bar 72 illustrated in FIGURES 1 and 5.

The shaft 220 carrying the cams 230 and 232 is continuously driven by the motor 192 through the mechanism hereinbefore described. The cam 230 engages the roller 238 mounted upon the arm 235, the shape of the cam being such as to displace the roller and effecting pivotal movement of the arm 235 about its pivot shaft 236. The movement is transmitted to the arm 240 which swings in an upward direction as viewed in FIGURES 1 and 3 moving the connecting link or bar 242 upwardly, which action, through the arm 245, causes partial rotation of the shaft 80 in a clockwise direction as viewed in FIGURE 1.

This rotation moves the arms 77 and the bar 72 toward the mandrel 32 and feeds or delivers the blank B into a position beneath the mandrel 32. The configuration of the cam 230 is such that after the blank is moved to the position beneath the mandrel, the cam moves out of engagement with the roller 238 and, under the influence of the contractile spring 247, the shaft 80 is rotated in a counterclockwise direction as viewed in FIGURE 1 and FIGURE 5 to return the bar 72 to its initial position to accommodate a succeeding blank delivered on to the table 70.

As the cam 230 moves away from the roller 238, the cam 232 comes into contact with the roller 254 carried by the arm 134. The contour of the cam 232 is such as to rotate the arm 134 about its pivotal support 135 in a counterclockwise direction as viewed in FIGURE 3 to actuate the arm 130, connecting link 124 and the toggle links 115, 116, 118 and 119 to elevate the dies 88 to form the flat blank B into a U-shaped blank B' around the lower half of the mandrel 32 as shown in FIGURE 5.

At the initiation of the upward movement of the dies 88, the expansive pressure of the springs 108 engages the retaining pad 100 with the blank just prior to engagement of the dies 88 therewith so that the blank is held in proper position. During the further or continued upward movement of the dies 88, the springs 108 are compressed so that the blank is firmly gripped between the pad 100 and the mandrel 32 to prevent dislodgement of the blank during the forming of the U-shaped configuration.

It should be noted that the cam 232 is configurated with a substantial dwell in the operative position of the dies 88 so that the dies continue to hold the blank in U-shaped configuration during bending and forming operations performed by the tools carried by the carriage 56. During the operation of the dies 88 in forming the U-shaped configuration, the carriage 56 is at the left end region of the apparatus as shown in FIGURE 3.

The continuous movement of the chains 140 and 142 establish continuous reciprocation of the carriage 56 but the dwell at the region of transition of the arm 164 as the chains progress around the rearmost sprockets 148 and 150 provide sufficient time for the movement of the dies 88 to perform their operations upon the blank. The carriage 56 advances in a right-hand direction as viewed in FIGURE 3 and the several bending and forming rolls or tools carried thereby perform the seam forming operations of the character illustrated in FIGURES 6 through 10 and hereinbefore described to complete the formation of a tube T from the U-shaped blank B' on the mandrel 32.

As the carriage 56 reaches its extreme position at the right-hand end of the apparatus as viewed in FIGURE 3, the cam 232 moves out of contact with the roller 254 thus permitting the dies 88 to move downwardly out of engagement with the blank and away from the mandrel 32. The abutments on the rods 102 are engaged by the bar 94 moving downwardly to disengage the pad 100 from the blank so as to permit the stripper finger 412 on the carriage to engage the end of the finished tube and strip or project the same from the mandrel 32.

As the carriage 56 approaches its extreme position in a left-hand direction as viewed in FIGURE 3, the cam 230 has been rotated to a position where it again engages the roller 238 to actuate the blank feeding mechanism and deliver a succeeding blank into a position adjacent the mandrel preparatory to the initiation of the cycle of operations of the various components to form such blank into a tube in the manner described.

Through the employment of the novel power dividing means or differential mechanism particularly illustrated in FIGURE 5, the load of advancing the carriage 56 during tube forming operations is equalized between the chains 140 and 142 so that liability of the failure of the chains is reduced to a minimum. It will be understood from the foregoing that the formation of tubes from sheet metal blanks in the manner described is entirely automatic and is accomplished through components and mechanisms which are positively driven, thus minimizing or substantially eliminating the possibility of breakdowns of the apparatus whereby continuous and uninterrupted production of tubes is assured with a minimum of maintenance.

It is apparent that, within the scope of the invention, modifications and different arrangements may be made other than is herein disclosed, and the present disclosure is illustrative merely, the invention comprehending all variations thereof.

We claim:

1. Apparatus for forming tubes from sheet metal blanks including, in combination, a frame, a mandrel supported thereby, a die for forming a metal blank on the mandrel to U-shape, a carriage mounted on the frame for reciprocatory movement, metal bending and forming rolls on said carriage engageable with the U-shaped blank on the mandrel for configurating the blank into a tube, a plurality of endless chains, means connecting the chains with the carriage whereby continuous movement of the chains in one direction effects a reciprocation of the carriage, a motor, means for actuating said die, and differential means connected with said chains and driven by the motor for transmitting substantially equal driving forces to each of said chains.

2. Apparatus for performing shaping operations on sheet metal blanks including, in combination, a frame, means on the frame adapted to support a blank, a carriage mounted for reciprocating movement relative to the frame, forming means on said carriage engagable with a metal blank for shaping the blank to predetermined configuration, driving means for the carriage including a pair of endless chains, means connecting the chains with the carriage whereby continuous movement of the chains in one direction effects reciprocation of the carriage, a motor, and power equalizing means interposed between the motor and said chains for transmitting equal driving force to each of said chains.

3. Apparatus for forming tubes from sheet metal blanks including, in combination, a frame, a mandrel supported thereby, die means for forming a metal blank partially around the mandrel to U-shape, a member mounted on the frame for reciprocatory movement, metal bending and forming tools supported by said member engagable with the U-shaped blank on the mandrel for configurating the blank into a tube, a pair of endless chains, means including a link connecting the chains with the member to provide continuous movement of the chains in one direction upon reciprocation of the member, a motor, means for actuating said die means, and differential means connected with said chains and driven by the motor for transmitting substantially equal driving forces to each of said chains.

4. Apparatus for forming tubes from sheet metal blanks including, in combination, a frame, a mandrel, die means movably supported on the frame arranged to bend a metal blank partially around the mandrel to U-shaped configuration, a carriage provided with tube forming means, means associated with the frame supporting the carriage for reciprocating movement, means for reciprocating the carriage including a pair of endless chains, an element connected with both chains and the carriage, a motor, means for actuating the die means, means driven by said motor for continuously driving the pair of chains to reciprocate the carriage lengthwise of the mandrel whereby the tube forming means on the carriage engages and forms the U-shaped configuration of the blank into a tube, said chain driving means including a power dividing mechanism whereby the driving forces transmitted to the chains are substantially equalized.

5. Apparatus for forming tubes from sheet metal blanks including, in combination, a frame, a die for forming a metal blank to U-shaped configuration, a carriage mounted on the frame for reciprocatory movement, metal bending and forming rolls on said carriage engagable with the U-shaped blank for configurating the blank into a tube, a plurality of endless chains, means connecting the chains with the carriage whereby continuous movement of the chains effects reciprocation of the carriage, means for actuating said die, bearings carried by the frame, a revoluble housing journaled in said bearings, a motor, means driven by said motor for rotating the housing, a pair of axially aligned shafts extending into the housing, differential gearing in the housing establishing operative connection between the shafts, a second pair of journally supported shafts, a sprocket carried by each of said second pair of chafts and arranged to engage and drive one of said chains, and means connecting respective shafts of each pair to transmit substantially equal driving forces to each of said chains.

6. Apparatus for forming tubes from sheet metal blanks including, in combination, a frame, a mandrel supported thereby, a die for forming a metal blank around the mandrel to U-shape, a carriage mounted on the frame for reciprocatory movement, metal bending and forming tools on said carriage engageable with the U-shaped blank on the mandrel for configurating the blank into a tube, a first pair of endless chains, means connecting the chains with the carriage whereby continuous movement of the chains in one direction effects reciprocation of the carriage, a motor, cam means driven by the motor for actuating said die, bearings carried by the frame, a revoluble housing journaled in said bearings, means driven by said motor for rotating the housing, a first pair of axially aligned shafts extending into the housing, differential gearing in the housing establishing operative connection between the shafts and housing, a second pair of journally supported shafts, a sprocket carried by each shaft of said second pair of shafts and arranged to engage and drive respectively each of said first pair of chains, and a second pair of endless chains connecting respective shafts of each pair of shafts to transmit substantially equal driving forces to said first pair of chains connected with the carriage.

7. Apparatus for forming sheet metal blanks into tubes including, in combination, a frame, a mandrel supported on the frame, die means adapted to fold a blank partially around the mandrel, a track arranged parallel with said mandrel, a carriage movable along said track, metal forming and bending devices supported by said carriage and operable upon movement of the carriage in one direction to form the blank on the mandrel into a tube, a motor, cam means driven by the motor for actuating said die, a power dividing mechanism driven by the motor, said power dividing mechanism including a rotatable housing, axially aligned sleeves rotatable with the housing and extending in opposite directions from the housing, journal means supporting said sleeves, means connected with the motor and one of the sleeves for rotating the sleeves and the housing, a shaft revolubly supported in each sleeve and extending into the housing, differential gearing in said housing connecting said shafts, and housing, a second pair of shafts, bearing means supporting said second mentioned shafts, a first pair of endless chains having operative connection with the carriage, a driving sprocket for each chain of the first pair, each of said driving sprockets being carried by a shaft of the second pair of shafts, and a second pair of chains and sprocket means connecting respectively each of said first pair of shafts with the shafts of said second pair whereby a power equalizing drive is established to the first pair of chains connected with the carriage.

8. Apparatus for forming sheet metal blanks into tubes including, in combination, a frame, a mandrel supported on the frame, means for feeding metal blanks successively to a position adjacent the mandrel, a die adapted to fold a blank partially around the mandrel, a track arranged parallel with said mandrel, a carriage slidable along said track, metal forming and bending rolls supported by said carriage and operable upon movement of the carriage in one direction to form the blank on the mandrel into a tube, a motor, cam means driven by the motor for sequentially actuating said blank feeding means and said die, a power dividing mechanism driven by the motor, said power dividing mechanism including a rotatable housing, axially aligned sleeves rotatable with the housing and extending in opposite directions, journal means supporting said sleeves, means connected with the motor and one of the sleeves for rotating the sleeves and the housing, a shaft revolubly supported in each sleeve and extending into the housing, differential gearing in said housing connecting said shafts and housing, a second pair of axially aligned shafts, bearing means supporting said second mentioned shafts, a first pair of endless chains having operative connection with the carriage, a driving sprocket for each chain, each of said driving sprockets being carried by a shaft of the second pair, and a second pair of chains and sprocket means connecting said first pair of shafts with the shafts of said second pair whereby a power equalizing drive is established to the first pair of chains connected with the carriage.

9. Apparatus for forming tubes from sheet metal blanks including, in combination, a frame, a mandrel, die means movably supported on the frame arranged to bend a metal blank partially around the mandrel to U-shaped configuration, an I-shaped beam, a carriage provided with tube forming means, a track associated with the I-shaped beam supporting the carriage for reciprocating movement, means for reciprocating the carriage including a first pair of endless chains disposed at one side of the I-shaped beam, a member connecting both chains with the carriage, means for actuating the die means to bend a blank partially around the mandrel, means for continuously driving the pair of chains to reciprocate the carriage lengthwise of the mandrel whereby the tube forming means on the carriage engage and form the U-shaped blank into a tube, said chain driving means including a motor, a shaft, speed reducing gearing between said motor and shaft, bearing means supported on said frame, a rotatable housing provided with axially extending sleeves journaled in said bearing means, means associated with said shaft for rotating the housing, a stub shaft supported within each sleeve and extending into the housing, a gear mounted on each stub shaft and disposed within the housing, differential pinions journally supported in said housing and meshing with the gears carried by the stub shafts, a pair of secondary shafts, driving sprockets on said secondary shafts engaging respectively the chains of the first pair, sprocket means mounted by each of the stub shafts and secondary shafts, and a second pair of chains connecting the sprocket means mounted by the stub and secondary shafts whereby the equal driving forces are transmitted to each of the chains of the first pair.

References Cited in the file of this patent

UNITED STATES PATENTS

| | | |
|---|---|---|
| 866,505 | Naysmith | Sept. 17, 1907 |
| 1,727,232 | Farrell | Sept. 3, 1929 |
| 2,593,470 | Matthews et al. | Apr. 22, 1952 |
| 2,644,416 | Miller et al. | July 7, 1953 |
| 2,831,358 | Michie | Apr. 22, 1958 |